United States Patent Office
3,488,748
Patented Jan. 6, 1970

3,488,748
RUMINANT FEED COMPOSITIONS CONTAINING A PROPIONYL SUBSTITUTED UREA
Laurence Alastair Davey and Ronald Joseph Boscott, Deal, Kent, England, assignors to Chas. Pfizer & Co., Inc., New York, N.Y., a corporation of Delaware
No Drawing. Filed Oct. 25, 1966, Ser. No. 589,234
Claims priority, application Great Britain, Nov. 25, 1965, 50,128/65
Int. Cl. A61k 25/00, 27/00
U.S. Cl. 424—322
11 Claims

ABSTRACT OF THE DISCLOSURE

Ruminant feed compositions containing either N-monopropionylurea or N,N'-dipropionylurea as the essential active ingredient, N-monopropionylurea being preferred. The compositions are useful for increasing the blood glucose levels of the animals.

---

This invention relates to improved ruminant feed compositions as well as a process for increasing health and growth of ruminants by administering propionyl-substituted ureas.

It is the object of this invention to provide a means of obtaining increased blood glucose levels in ruminants such as sheep, cows, goats and oxen. This invention arises from our discovery that propionyl-substituted ureas, the simplest of which is monopropionylurea

(CH$_3$CH$_2$CONHCONH$_2$)

are hydrolyzable by the rumen flora to propionic acid. On the passage from the rumen, propionic acid is converted to glucose and the glucose thus generated is, through circulation in the blood, made available for the animal's nutritional requirements.

Another object of this invention is to provide a method for increasing the blood glucose levels of ruminants to assist in the prevention and cure of those metabolic disorders that are due to low blood glucose levels. One such disorder is pregnancy toxemia of sheep. This is a disease to which, owing to the heavy nutritional demands of the developing foetus, pregnant ewes become liable whenever supplies of their ordinary fodder are reduced, as in bad weather on hill farms. In these circumstances, one can supplement the fodder, which is available to the ewes, with a propionyl-substituted urea during the last 5 or 6 weeks of pregnancy. By substituting a feed containing a propionyl-substituted urea-containing feed for the regular fodder, the incidence and the severity of pregnancy toxemia are reduced. The effects of pregnancy toxemia are often death of the foetus and death of the ewe.

While the use of propionic acid as a gluconeogenic additive is well known, the process of this invention affords a new and improved method of supplying the propionyl radical to the ruminant for conversion to glucose. U.S. Patent No. 2,965,488 issued on Dec. 20, 1960, to Irvin Joseph Belasco claims the use of the sodium and calcium salts of acetic and propionic acids in providing a more efficient utilization of urea, in urea-containing feeds, by animals ingesting such feed. We have found that when the sodium, potassium, calcium and ammonium propionates are given to animals as a source of propionyl radicals the rate of release of the propionyl radical produced by hydrolysis is so high that much of the liberated propionic acid leaves the rumen unchanged and is lost. On the other hand, if sufficient soluble salts of propionic acid were given to the animal to allow the efficient conversion of the propionic acid the animal's metabolic balance would be upset.

We have found that propionyl-substituted ureas are hydrolyzed in the rumen by the rumen flora to propionyl radicals and urea at a much slower rate than are the soluble salts of propionic acid. This slower hydrolyzation allows the resulting propionyl radicals to be converted more efficiently to glucose by the ruminant. The urea resulting from the hydrolysis is broken down to ammonia which is used for protein synthesis.

In an article in the Journal of Animal Science, vol. 13 (1954) the above-mentioned Belasco further reported that acetylurea, a compound similar to the compounds of this invention, was a poor source of available nitrogen in the rumen. Furthermore, propionamide is reported as producing low levels of ammonia in addition to providing biologically available nitrogen as indicated by good bacterial growth. While the propionyl-substituted ureas of this invention supply a minor amount of urea, and consequently ammonia, to the metabolic system of the ruminant, they are primarily intended to supply an adequate source of propionyl radicals and consequently glucose, to the metabolic system of the animal.

Broadly, this invention is a method for increasing the blood glucose levels of ruminants which comprises administering to the animal a propionyl-substituted urea of the formula:

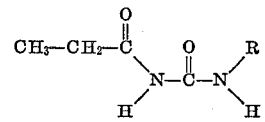

where R is hydrogen or propionyl. This invention also includes the aforesaid method wherein from about 5 to about 15 grams of monopropionyl urea per 100 kilograms of animal body weight is administered to the animal daily and wherein from about 3 to about 12 grams of N,N'-dipropionylurea per 100 kilograms of animal body weight is administered daily. Also included in this invention is an animal feed composition effective in increasing blood glucose levels in ruminants which comprises a nutritionally-balanced feed and from about 0.5 to about 15 weight percent of a propionyl-substituted urea having the formula:

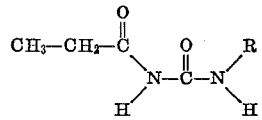

where R is hydrogen or propionyl. This invention further includes a veterinary medicament for increasing the blood glucose levels of ruminants which contains as the essential active ingredient one of the aforementioned propionyl-substituted ureas. Also included in this invention is an animal feed pre-mix which comprises a carrier and from 50 to about 95% by weight of one of the aforementioned propionyl-substituted ureas.

A specific embodiment of the process of this invention as it relates to increasing the blood-glucose levels of ruminants comprises mixing the aforesaid propionyl-substituted urea with feed materials such that the total mixture is a nutritionally-balanced feed, that is to say, the mixture will contain the sources of carbohydrate, assimilable nitrogen, vitamins (particularly vitamins A and D) and mineral elements (particularly calcium and phosphorus) that are essential to the diet of the animals. Although the propionyl-substituted urea is a source of the carbohydrate glucose, it cannot be employed as the sole source of carbohydrate, and accordingly a nutritionally balanced feed will contain a conventional carbohydrate source, such as cereal (e.g. barley meal). However, the amount of such other carbohydrate source that has to be consumed to maintain health will be less than that needed in the absence of the propionyl-substituted urea. Cereals such as barley meal contain an appreciable portion of assimilable nitrogen (in the form of vegetable protein), and if such cereal is used as an additional carbohydrate source in the mixture, then no separate source of assimilable nitrogen need be included, for the propionyl-substituted urea itself supplies assimilable nitrogen. However, separate sources of nitrogen may be included if desired, either in the form of non-protein nitrogen, such as urea or in the form of protein nitrogen, such as that present in soya bean meal. The propionyl-substituted ureas of this invention may be administered to animals admixed with a feed material and comprising a nutritionally-balanced feed as described above, or the compounds may be fed separately from the other ingredients. Methods of feeding the propionyl-substituted urea comprise mixing the material with a cereal and sprinkling the mixture on the regular daily feed. Accordingly, the propionyl-substituted urea may be combined with a diluent such as talc or bentonite and sprinkled on the regular feed. The effective ingredients of this invention may also be added to a pre-mix feed or it may be mixed with a feed supplement. The feed compositions of this invention may be formed into pellets by the use of binders such as molasses or gum. Feed blocks are also contemplated in this invention. Such blocks may be made with gum and cane molasses and are especially suitable as a feed for ewes on hill farms. The amount of propionyl-substituted urea suitably fed is that equivalent to a total daily supply of about 1 gram or more of propionyl radical per 100 kilograms of body weight. The preferred amount is equivalent to about 2½ to 7½ grams of propionyl radical per 100 kilograms of body weight. Thus for monopropionyl-urea, the preferred amount corresponds to a daily supply of from about 5 to about 15 grams per 100 a daily supply of from about 5 to about 15 grams per 100 kilograms of body weight. For N,N'-dipropionylurea, the preferred levels are from about 3 to about 12 grams of the urea per 100 kilograms of animal body weight. While lower levels of the propionyl-substituted ureas may be used and signficant results obtained thereby, the preferred levels are the most economically efficient levels. Higher levels, while also contributing to the non-protein nitrogen intake, are effective but not economical. The preferred daily consumption of propionyl-substituted urea is most effectively administered by adding from about 0.5 to about 15 weight percent of the urea to the feed. Of course, higher levels are added to feed supplements and to pre-mixes. Thus, a mixture of the propionyl-substituted urea with an inert carrier such as bentonite clay or talc, intended for addition to other components to form a nutritionally complete feed, may contain the equivalent of 45% or more by weight of propionyl radical; while a nutritionally balanced feed may contain as little as ¼ % by weight of propionyl radical. Variations in the preferred levels may be made to correspond to the amount of food consumed per day as well as to the weight of the animal.

While the administration of the propionyl-substituted ureas of this invention to animals is most conveniently accomplished by mixing the compound with the daily ration of feed, as a pre-mix or as a supplement to the daily ration either in pellet form, as a feed block, or sprinkled on the feed, the compounds may also be administered to animals as tablets, capsules and boluses prepared according to conventional means.

EXAMPLE I

The ingredients of Table I were intimately mixed in the proportions indicated and the mixture was compressed into blocks of generally cylindrical form, each weighing about 25 kilograms and of 30 centimeters diameter. When ewes weighing about 70 pounds are fed this composition, they show a higher blood glucose level than do ewes fed the same diet without the propionyl-substituted urea. The daily intake of propionyl-substituted urea is calculated to be about 5 grams per 100 kilograms of animal body weight.

Table I

| Ingredients: | Weight percent |
|---|---|
| Barley meal | 30.0 |
| Distillers solubles | 25.0 |
| Urea | 7.5 |
| Monopropionylurea | 4.4 |
| Dicalcium phosphate | 2.5 |
| Magnesium carbonate | 1.0 |
| Vitamin A (10,000 units/gram) | 1.0 |
| Vitamin D (300 units/gram) | 1.0 |
| Sodium chloride [1] | 16.0 |
| Gum | 4.5 |
| Cane molasses | 1.0 |
| Water | 6.1 |

[1] Salt concentration to limit the intake of the block material to about 0.1 kilogram per head per day.

When N,N-dipropionylurea is substituted for monopropionylurea similar results are obtained.

EXAMPLE II

At a time 9 weeks before lambing was due, two groups (A and B) of 11 pregnant ewes were put on a diet of hay, mangolds, silage and cereal-based range block (providing proteins, carbohydrates, vitamins and minerals). All the ewes were given enough of the diet to provide both ordinary (i.e. preconception) nutritional requirements and the additional material needed for growth of the foetus. Those ewes in Group B were additionally given 5 grams of monopropionylurea per day. Blood-glucose levels were determined at 9 weeks, 4 weeks and 1 week before lambing with the results shown in Table II.

TABLE II

| | Blood-glucose levels (mg./100 ml. of blood) | |
|---|---|---|
| | A (control) | B |
| Weeks before lambing: | | |
| 9 | 49.4 | 49 |
| 4 | 24.3 | 36.6 |
| 1 | 11.9 | 26 |

The ewes fed the monopropionylurea showed increased blood-glucose levels.

Similar results are obtained when N,N'-dipropionylurea is fed to the ewes.

EXAMPLE III

When ewes weighing between 70 and 80 pounds are fed the diet of Table II, they show increased blood-glucose levels when compared to ewes fed on the same diet except for the monopropionylurea.

Table III

| Ingredients: | Weight percent |
|---|---|
| Monopropionylurea | 10.5 |
| Urea | 1.0 |
| Bone meal | 1.0 |
| Ground yellow corn | 41.5 |
| Dehydrated alfalfa meal | 35.0 |
| Cane molasses | 8.0 |
| Bentonite | 3.0 |
| | 100.0 |

The average daily consumption of monopropionylurea is calculated to be about 15 grams per 100 kilograms of animal body weight.

When N,N'-dipropionylurea is substituted for monopropionylurea in the above example, similar increases in blood-glucose levels are obtained.

EXAMPLE IV

When lambs, weighing between about 70 and 80 pounds, are fed the diet of Table IV, they show an increased blood-glucose when compared to lambs fed the same diet except for the dipropionylurea.

Table IV

| Ingredients: | Weight percent |
|---|---|
| N,N'-dipropionylurea | 0.7 |
| Urea | 1.0 |
| Bone meal | 1.0 |
| Ground yellow corn | 51.3 |
| Dehydrated alfalfa meal | 35.0 |
| Cane Molasses | 8.0 |
| Bentonite | 3.0 |
| | 100.0 |

The average daily consumption of N,N'-dipropionylurea is calculated to be about 3 grams per 100 kilograms of body weight on the basis of a total feed intake of about 0.43 kilogram per 100 kilograms of body weight per day.

When monopropionylurea is substituted for N,N'-dipropionylurea in this example similar results are obtained.

EXAMPLE V

When sheep of an average weight of 70 kilograms are fed the nutritionally-balanced diet of Table V, they show an increased blood-glucose level when compared to sheep fed on the same diet without the N,N'-dipropionylurea.

Table V

| Ingredients: | Weight percent |
|---|---|
| N,N'-dipropionylurea | 3.0 |
| Dehydrated alfalfa meal | 35.0 |
| Ground yellow corn | 47.0 |
| Urea | 1.0 |
| Bone meal | 1.0 |
| Cane molasses | 10.0 |
| Bentonite | 3.0 |
| | 100.0 |

The average daily consumption of N,N'-dipropionylurea is calculated to be about 12 grams per 100 kilograms of body weight.

Similar results are obtained when monopropionylurea is substituted for N,N'-dipropionylurea in this example.

EXAMPLE VI

When dairy heifers are fed the nutritionally-balanced diet in Table VI, they show higher blood-glucose levels than dairy heifers fed the same diet without the monopropionylurea.

Table VI

| Ingredients: | Weight percent |
|---|---|
| Timothy hay | 46 |
| Alfalfa | 2 |
| Yellow corn | 28 |
| Soybean meal | 1 |
| Crimped oats | 14.5 |
| Urea | 2 |
| Calcium propionate | 2 |
| Attapulgite clay | 1 |
| Dicalcium phosphate | 1 |
| Mineralized salt | 2 |
| Monopropionylurea | 0.5 |
| | 100.0 |

Similar results are obtained when N,N'-dipropionylurea is substituted for monopropionylurea in this example.

EXAMPLE VII

A nutritionally-balanced feed supplement for the feeding of ruminants is prepared according to Table VII. When ruminants are fed on this diet they show an increased blood-glucose level.

Table VII

| Ingredients: | Weight percent |
|---|---|
| Ground barley | 35 |
| Crimped oats | 10 |
| Wheat bran | 10 |
| Soybean oil meal | 5 |
| Cane molasses | 10 |
| Corn gluten feed | 10 |
| Urea | 2 |
| Sodium propionate | 1 |
| Attapulgite clay | 1 |
| Dicalcium phosphate | 0.5 |
| Mineralized salt | 0.5 |
| Monopropionylurea | 15 |
| | 100.0 |

When N,N'-dipropionylurea is substituted for monopropionylurea in this example, similar results are realized.

EXAMPLE VIII

When an animal feed pre-mix composition prepared with the ingredients of Table VIII are added to a regular nutritionally balanced feed to give a total daily intake of 5 grams monopropionylurea, the animals show increased blood-glucose levels.

TABLE VIII

| | Formulation wt. percent | | | |
|---|---|---|---|---|
| | A | B | C | D |
| Ingredients: | | | | |
| Monopropionylurea | 50 | 95 | 75 | 60 |
| Bentonite | 20 | 5 | 10 | |
| Talc | 30 | | 15 | 40 |
| | 100 | 100 | 100 | 100 |

Similar results are obtained when N,N'-dipropionyl urea is substituted for monopropionylurea and 3 grams of dipropionylurea per day are fed to the animals.

What is claimed is:

1. A method for increasing the blood glucose levels of ruminants which comprises orally administering to the animal a blood glucose-increasing amount of a propionyl-substituted urea of the formula $$CH_3-CH_2-\underset{\underset{H}{\big|}}{\overset{\overset{O}{\|}}{C}}-N-\underset{R}{\overset{O}{\underset{\|}{C}}}-N\underset{R}{\diagup}$$

where R is hydrogen or propionyl.

2. A method according to claim 1 where R is hydrogen.
3. A method according to claim 1 where R is propionyl.
4. A method according to claim 2 wherein from about 5 to about 15 grams of monopropionylurea per 100 kilograms of animal body weight is administered daily.
5. A method according to claim 3 wherein from about 3 to about 12 grams of N,N'-dipropionylurea per 100 kilograms of animal body weight is administered daily.
6. An animal feed composition effective in increasing blood glucose levels in ruminants which comprises a nutritionally-balanced feed and from about 0.5 to about 15 weight percent of a propionyl-substituted urea having the formula:

$$CH_3-CH_2-\underset{\underset{H}{\big|}}{\overset{\overset{O}{\|}}{C}}-N-\underset{H}{\overset{O}{\underset{\|}{C}}}-N\underset{R}{\diagup}$$

where R is hydrogen or propionyl.

7. An animal feed composition according to claim 6 where R is hydrogen.
8. An animal feed composition according to claim 6 where R is propionyl.

9. An animal feed pre-mix which comprises talc and from about 50 to about 95% by weight of a propionyl-substituted urea having the formula:

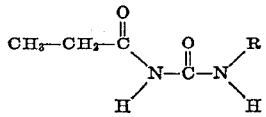

where R is hydrogen or propionyl.

10. An animal feed pre-mix which comprises bentonite clay and from about 50 to about 95% by weight of a propionyl-substituted urea having the formula:

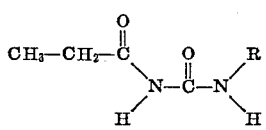

where R is hydrogen or propionyl.

11. An animal feed pre-mix which comprises cereal and from about 50 to about 95% by weight of a propionyl-substituted urea having the formula:

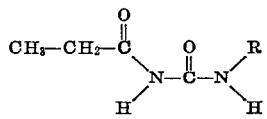

where R is hydrogen or propionyl.

References Cited

UNITED STATES PATENTS 2,965,488  12/1960  Belasco ---------------- 99—2

OTHER REFERENCES

Stoughton, Roger W.: Diacylureas, J. Org. Chem., vol. 2, pp. 514–521 (1938).

Noller, Carl R.: Textbook of Organic Chemistry, 2nd ed., W. B. Saunders, Philadelphia, Pa. (1958).

FRANK CACCIAPAGLIA, JR., Primary Examiner

J. V. COSTIGAN, Assistant Examiner